Feb. 28, 1939. E. J. PILBLAD 2,148,498
LOCKING DEVICE
Filed Aug. 29, 1936 2 Sheets-Sheet 1
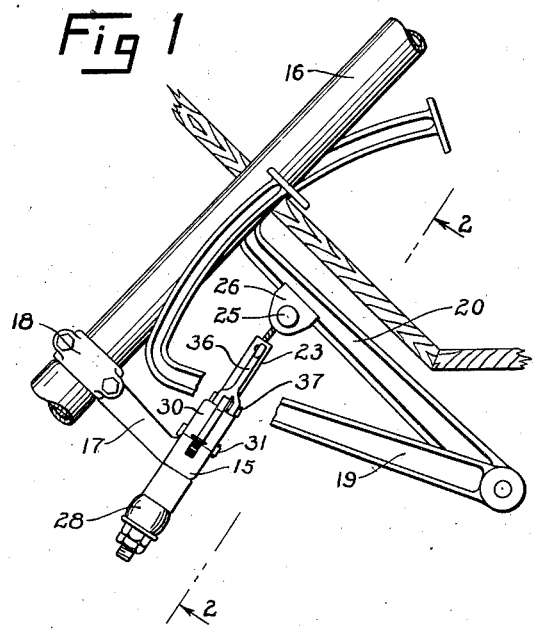
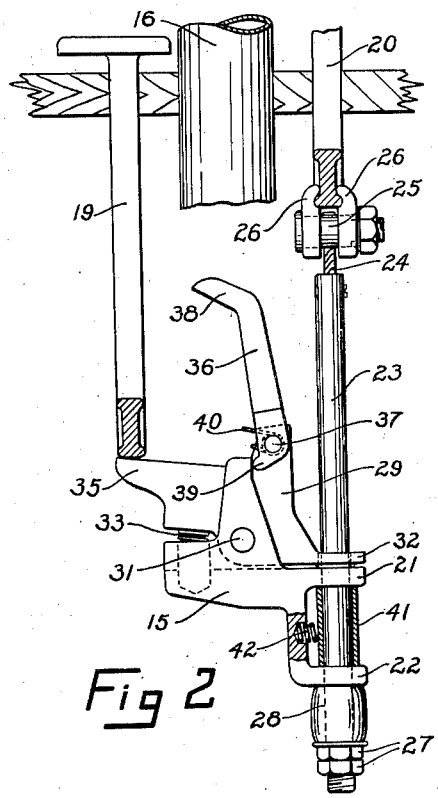
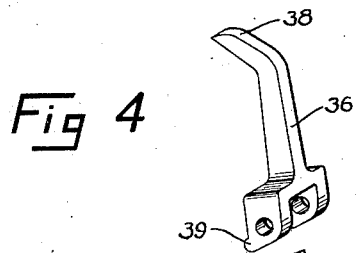
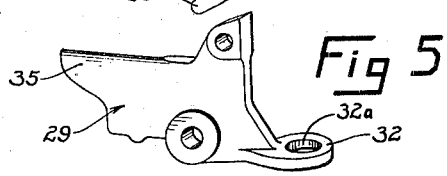
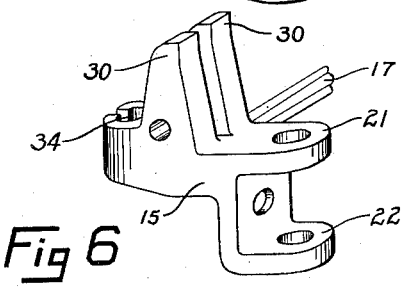
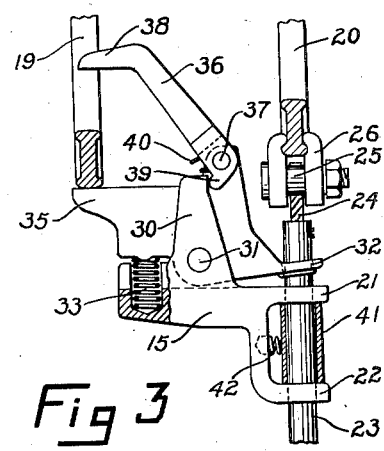
INVENTOR.
Eric J. Pilblad
BY F. Bascom Smith
ATTORNEY.

Feb. 28, 1939. E. J. PILBLAD 2,148,498
LOCKING DEVICE
Filed Aug. 29, 1936 2 Sheets-Sheet 2
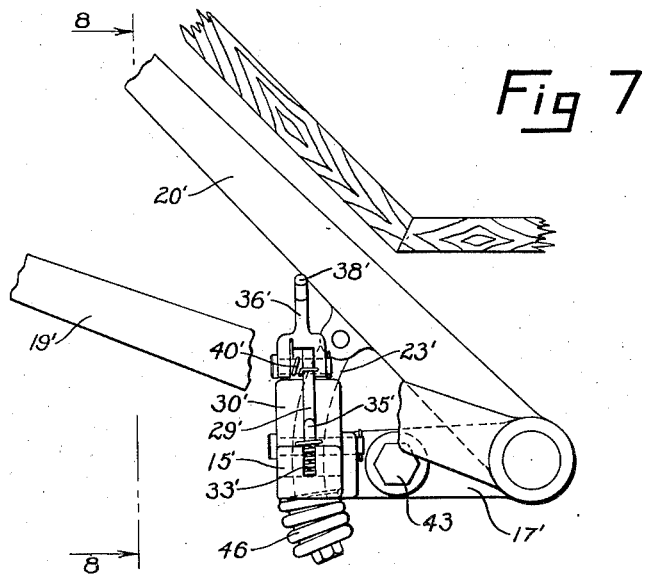
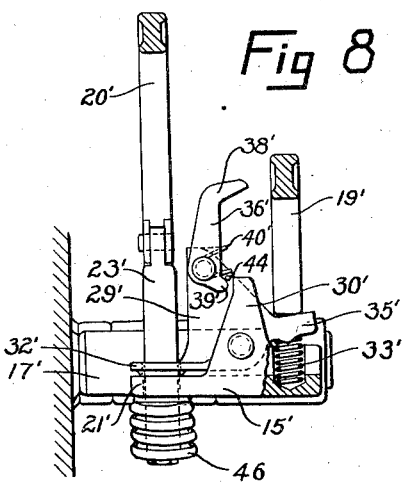
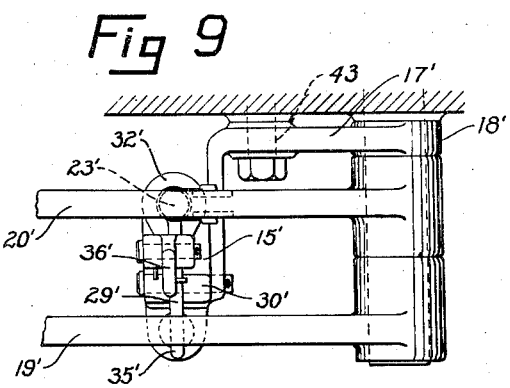
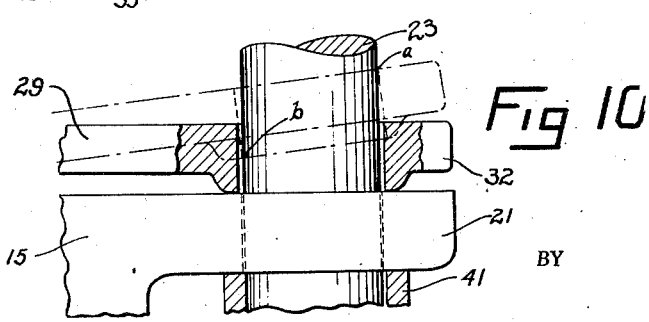
INVENTOR.
Eric J. Pilblad
BY F. Bascom Smith
ATTORNEY.

Patented Feb. 28, 1939

2,148,498

UNITED STATES PATENT OFFICE 2,148,498

LOCKING DEVICE

Eric J. Pilblad, Rockville Centre, N. Y., assignor of twenty-six and one-fourth per cent to Charles C. Strange, seventeen and one-half per cent to Alan J. McIntosh, seventeen and one-half per cent to Alvan L. Barach, and twelve and one-half per cent to Edmund J. Barach, all of New York, N. Y.

Application August 29, 1936, Serial No. 98,569

31 Claims. (Cl. 192—13)

This invention relates to locking devices and more particularly to apparatus whereby the locking and releasing of a member may be controlled by a second member which is movable relatively to said first member.

One of the objects of the present invention is to provide novel means whereby the brakes of an automotive vehicle may be locked in applied position and released under control of the clutch mechanism of said vehicle.

A large number of devices of various kinds and operating on various principles have been heretofore proposed whereby the brakes of an automotive vehicle may be held in applied position without the exertion of pressure directly upon the brake operating pedal for the purpose of freeing the driver's right foot for use in actuating the accelerator pedal when the vehicle is being started on a hill, for example. None of these prior devices have been entirely satisfactory and most of the same are wholly impractical from a commercial standpoint. Most of the devices heretofore provided have been very complicated in construction, expensive to manufacture, difficult to install, and subject to frequent failure because of the large number of parts employed. Furthermore, certain of said prior art devices have operated in such a manner as to necessitate a material change in the average driver's mode of operating an automobile, and accordingly constitute a real danger when installed on a car driven by one not experienced and skilled in operating the device. Other devices, in fact substantially all of the prior art devices having any merit whatever, have been such as to interfere with the free operation of the clutch and brake mechanisms in the usual or any desired manner.

It is accordingly another object of this invention to provide a novel device whereby the foregoing disadvantages and faults will be obviated.

Another object is to provide novel apparatus of the above type which may be inexpensively constructed from a small number of comparatively rugged parts that may be readily and quickly assembled, said apparatus being very simple both in construction and operation and adapted to occupy only a small amount of space.

Still another object is to provide brake locking apparatus for an automotive vehicle which is so constructed that the same may be quickly and properly installed by an ordinary mechanic.

A further object is to provide novel brake holding means for an automotive vehicle which may be rendered operative in a very simple manner at the will of the driver and which do not interfere in any way with the freedom of operation of any part of the vehicle.

Still another object is to provide a brake holding device which may either be installed on existing cars or built into new ones as an integral part thereof.

Another object is to provide a novel device which is adapted for use on automotive vehicles whereby the latter may be held against either forward or backward movement at any time without a continued exertion of pressure on the brake pedal and whereby the vehicle may be readily held against backward rolling on a hill without holding the clutch mechanism in slipping position as some drivers are in the habit of doing.

A still further object is to provide a device adapted for use on automobiles which is so constructed that the brakes may be held in applied position thereby, irrespective of the position of the gears in the transmission, and one which is not affected in any way by the vibration, or jarring of the vehicle, or by inertia when the speed of the vehicle is increased or decreased.

The above and further objects and novel features of the invention will more fully appear from the following detailed description when the same is taken in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views:

Fig. 1 is a somewhat diagrammatic side elevation, partly in section and with parts broken away, of one embodiment of the present invention installed on an automobile;

Fig. 2 is a rear view on an enlarged scale, partly in section and with parts broken away, the view being taken substantially on line 2—2 of Fig. 1;

Fig. 3 is a similar view showing the parts in locked position;

Figs. 4, 5, and 6 are detail isometric views of the cam or releasing member, the locking member and the supporting member, respectively the latter having a part broken away;

Fig. 7 is a view similar to Fig. 1 of a second embodiment of the invention;

Fig. 8 is an elevation, partly in section and with parts broken away, of the device of Fig. 7, looking at the same from the front of the vehicle;

Fig. 9 is a top plan view, with parts broken away, of the second embodiment; and, Fig. 10 is an enlarged detail view, partly in section and with parts broken away, showing the locking member in locked and unlocked position.

In general, the embodiments of the invention illustrated comprise means for locking the brake mechanism of an automotive vehicle in applied position, said means being adapted to be rendered operative to hold the brakes only at the will of the driver and being so constructed as to not interfere in any way whatever with the normal or emergency application and release of the brakes, except when said means are consciously rendered operative by the driver. The locking means is preferably controlled by the clutch mechanism in such manner that an additional and slight additional effort to that movement ordinarily employed in actuating the clutch is required to render said locking means operative; said additional effort need not be a continuing effort, however, during the entire time that the brakes are being held in applied position. The release of the locking means and, hence, of the brakes is accomplished by the release of the clutch mechanism for movement toward engaged position, it being possible, if desired, to time said release in any suitable manner with respect to the actual engagement of the clutch driving surfaces.

In the embodiment illustrated in Figs. 1 to 6, inclusive, the invention comprises a supporting member or frame 15 (Fig. 6) which is adapted to be secured to the steering column 16 or other suitable part of the vehicle, by means of an arm 17 formed as an integral part of the frame casting and having a clamp portion 18 at the outer end thereof. Frame 15 is thus supported in a fixed position in a plane between the clutch pedal 19 and the brake pedal 20 of the type provided on all modern automobiles.

On the brake pedal side of frame 15, the same is provided with a pair of vertically spaced ears or lugs 21 and 22 which have axially aligned openings therein for slidably receiving an element, such as a cylindrical rod 23, that is adapted to engage some part of the brake mechanism. As shown, said rod is flexibly connected to brake pedal 20 by means of a short length of wire cable 24 which is in turn secured to a pin 25 at a point between a pair of clamping jaws 26. The latter are adapted to be held in biting or clamping relation with pedal 20 by a nut threadedly received by the reduced end of pin 25. Rod 23 may, of course, be flexibly or pivotally secured to pedal 20 for movement therewith by any of several other well-known and suitable fastening means and may be considered as an element of the brake mechanism.

To prevent the accidental withdrawal of rod 23 from lugs 21 and 22 which slidably support and guide the same and to adjustably limit the return movement of pedal 20 under the influence of the usual spring provided for that purpose a pair of nuts 27 are threaded on the lower end of said rod. A yielding or resilient member 28 may be provided around rod 23 between nuts 27 and lug 22, if desired, for cushioning the return movement of the brake pedal.

For the purpose of locking the brake mechanism in applied position, i. e., with pedal 20 depressed, there is provided a locking member 29 (Fig. 5) which is adapted to be controlled by the driver through actuation of clutch pedal 19 to frictionally grip rod 23 and hold the same against upward movement. As shown, said locking member is pivotally secured to frame 15 between an upwardly extending bifurcated portion 30 of the latter by means of a pivot pin 31. Extending laterally to the right, as viewed in Fig. 5, and formed integrally with member 29 is a flat, comparatively thin portion 32 having an opening 32a therein through which rod 23 is adapted to freely extend.

Locking member 29 is normally held in inoperative or unlocking position, that is with portion 32 perpendicular to the longitudinal axis of rod 23 and the center line of opening 32a coinciding with said axis and the center line of the openings in lugs 21, 22, by means of a light coil spring 33. The latter, in the form shown, is loosely supported in recess 34 which is countersunk in frame member 15 and bears against the lower edge of a portion 35 of locking member 29. The parts are preferably so constructed and assembled that lug 21 constitutes a stop for limiting the pivotal movement of member 29 by spring 33, whereby said member is normally held in unlocked position, permitting free movement of rod 23 and, hence, of the brake mechanism in both directions.

Arm portion 35 of the locking member extends beneath clutch pedal 19 in a position such that the same will be engaged by said pedal during the last part of the downward or depression stroke of the latter, that is, a portion of the clutch pedal stroke after the clutch driving surfaces have been disengaged. When arm 35 is thus engaged and pivoted in a counter-clockwise or locking direction, as viewed in Fig. 3, locking portion 32 moves to an angular or tilted position with respect to rod 23 and frictionally grips the same, thereby holding the brakes against release from any position to which they have been moved by the driver. The diameter of opening 32a is preferably so proportioned with relation to the diameter or rod 23 as to limit the tilting movement of locking member 29, 32 so that portion 35 of the latter is never permitted to contact the upper surface of frame member 15. Thus, when the brakes are in applied position and member 29, 32 is tilted to locking position, the walls of opening 32a frictionally engage rod 23 as at points a and b (Fig. 10) and forces, which normally tend to release the brakes and hence exert an upward pull on rod 23, tend to pivot locking member 29, by reason of said frictional engagement, in a locking direction against the efforts of spring 33. The biting action between said member and the rod is accordingly increased by the pull exerted by rod 23 and insures that the brakes will be firmly held in applied position.

When member 29 is held in tilted or locking position, the brakes may nevertheless be applied or further applied with very little more than normal effort on the part of the driver, since the friction at points a and b is comparatively slight when the pressure exerted by rod 23 tends to move the locking member toward unlocked position. Thus, when a downward force is exerted on rod 23, there is no increasing tendency for locking member 29 to bite the rod as there is when the forces acting on the rod tend to move the locking member in the direction of tilt. It is accordingly impossible for the device of the present invention to prevent the application of the brakes by the driver at any time he desires to apply the same.

Spring 33 is preferably of sufficiently light construction so that once member 29 is moved to locking position by the downward movement of the clutch pedal and after pressure exerted by the driver on the brake pedal is released, said spring will be incapable of moving the said member to unlocked position, the frictional and biting engagement between said member and rod 23, which is enhanced by the forces which urge the brake mechanism toward released position, being adapted to effectively resist the efforts of spring 33. Accordingly, the clutch pedal need not be held in continuous contact with arm 35 to maintain the locking means in operative position. It will be seen, however, that if it is desired to release the gripping action of member 29, 32 without engaging the clutch driving surfaces, it is only necessary to apply a slight downward pressure on the brake pedal to relieve the upward pull of rod 23, whereupon the biting action of said member is reduced and spring 33 becomes effective to pivot the same to unlocking position. As will hereinafter appear, however, means are provided whereby the locking member may be released by movement of the clutch pedal either at the time of or at any time prior to the actual engagement of the clutch driving surfaces.

In order that the driver may have his or her right foot free for actuating the engine throttle or accelerator, such as when starting on the side of a hill, novel means are provided whereby the above described locking means for holding the brakes in applied position may be automatically released upon the movement of the clutch mechanism toward engaged position. Said means, in the form shown, comprise a pivoted lever 36 which constitutes cam means for moving locking member 29 to unlocking position. Said lever is pivotally mounted on locking member 29 by a pin 37 which extends through holes in the lower bifurcated end of the lever and an opening through said locking member adjacent the top thereof. The upper end 38 of lever 36 is preferably bent toward pedal 19 and the arms of the bifurcated end thereof terminate in nibs or cams 39 which engage arms 30 of frame 15.

When locking member 29 is in unlocked position, pawl 36, 38 is maintained in the position illustrated in Fig. 2 by a light spring 40 that is coiled around pin 37, one end of said spring engaging member 29 and the other end engaging arm 36. The movement of lever 36 by spring 40 is limited by the engagement of cams 39 with arms 30. As locking member 29 is pivoted to tilted or locking position (Fig. 3) by clutch pedal 19, pivot 37 moves in an arc to the left, as viewed in the drawings and since the lower end of lever 36 is prevented from moving in that direction, the upper end thereof swings to a position such that portion 38 extends into the path of the clutch pedal. Upon the release of the latter to permit the clutch driving surfaces to engage, lever 36, 38 is pivoted clockwise by pedal 19, and pivot 37, through the action of cams 39, moves to the right, thereby pivoting member 29 to unlocked position and accordingly releasing the brake mechanism. By reason of the fact that arm 36, 38 is much longer than the distance from pivot 37 to the tips of nibs 39, a substantial mechanical advantage is provided for releasing the grip of member 29, 32 on rod 23.

Suitable means are preferably provided for retarding the movement of brake pedal 20 when the same is released in the manner above described, said means, in the form shown in Fig. 2, comprising a sleeve 41 surrounding rod 23 between ears 21 and 22 and made of fibre or other suitable material between which and the metal of rod 23 the coefficient of friction is relatively high. A coil spring 42 or other yielding means may be provided for maintaining sleeve 41 and said rod in close frictional engagement.

In the operation of an automobile equipped with the above device, it will be seen that the brake and clutch mechanisms may be freely operated in the usual manner without interference from said device. When it is desired to render the locking device operable, the brakes are applied in the usual manner and a slight pressure is applied to arm 35 of locking member 29 by clutch pedal 19, and cam member 36, 39 is moved to the position of Fig. 3 in the manner fully described above. The driver may now take his right foot off the brake pedal and the brake will be held in engaged position until clutch pedal 19, on its upward movement, engages member 36, 38, to thereby move member 29 to unlocked position through the coaction of cams 36, 39 and arms 30. If desired, lever 36 may be made of such length as to extend across the path of pedal 19 at a point whereby the brakes will be released at substantially the same instant that the clutch driving surfaces engage, thereby obviating any possibility of rolling backwards when it is necessary to start up a hill.

A second embodiment of the invention which is intended primarily for use as a built-in unit for new vehicles is illustrated in Figs. 7 to 9, inclusive, wherein both the clutch and brake pedals are shown in disengaged position. Said second embodiment operates in substantially the same manner and comprises parts which are similar to the parts above described in connection with the first embodiment, and accordingly will not be described in the same detailed manner, but primed numerals are employed to designate parts which are similar to above-described parts that bear the same numeral.

In the form illustrated, said second embodiment comprises a frame member 15' which is rigidly secured in the desired position with relation to clutch and brake pedals 19' and 20', respectively, by means of an arm 17' formed integrally therewith. The latter is secured to the automobile chassis by a bolt 43 and has a portion 18' which surrounds the journal on which pedals 19' and 20' are mounted, as best seen in Fig. 9. A locking member 29' is pivotally mounted on frame 15' and is adapted to be normally held in inoperative position by a spring 33'. Pivotally secured to brake pedal 20' and freely extending through suitable openings in locking member 29', 32' and frame 15', 21' is a rod 23' which is preferably arcuate and adapted to be frictionally held against upward movement by said locking member when the latter is moved to tilted position by clutch pedal 19' engaging arm 35'.

For releasing the locking means once the same is rendered operative by the conscious will of the driver, a cam, arm or lever 36', 39' is pivotally mounted on locking member 29' and is normally held in the position illustrated by a spring 40', the movement of said lever by said spring being limited by a pin 44. When member 29' is pivoted to operative position, cam portions 39' engage arms 30', thereby causing the upper end 38' of lever 36' to be moved into the path of clutch pedal 19'. Thus, when the brakes are being held in applied position by the coaction of member 29' and rod 23', the same may be automatically released by the clutch engaging movement of pedal 19' in the same manner above described.

Novel means are provided for simultaneously retarding and cushioning the return movement of brake pedal 20', said means, in the form shown, being constituted by a collapsible bellows 46 which loosely surrounds the lower end of rod 23'. Bellows 46 is preferably made of comparatively soft rubber or the like and is adapted, by reason of its own inherent resiliency, to expand when the brake pedal is depressed. On the return movement of said pedal, the escape of air from the bellows through an annular space between the upper end of the bellows and rod 23', or other suitable opening, is sufficiently restricted to cause a pressure to be built up in the bellows and thus retard the movement of said pedal.

There is thus provided a novel locking device which is particularly adapted for use in locking the brakes of an automotive vehicle in applied position, said device being of extremely simple and inexpensive construction. A brake holding device is also provided which does not interfere with the normal operation of the brake and clutch mechanisms but becomes operative only at the will of the operator, the same being adapted for use on vehicles having what is known as the automatic clutch, as well as on other vehicles. The operation of the novel device provided is very simple and there is no danger that the brakes will ever be held in applied position while the vehicle is in motion or without the conscious knowledge of the driver. Novel means, controlled in accordance with the actuation of the clutch mechanism of the vehicle, are provided for applying and releasing the locking means. The device may be radily and quickly installed and is very reliable in operation, the possibility of failure being minimized by the small number of parts which are necessary.

Although only two specific embodiments of the invention have been illustrated and described in detail, it is to be expressly understood that the same is not limited thereto but that various changes may be made, particularly in the design and arrangement of parts illustrated without departing from the spirit and scope of the invention, as will now be apparent to those skilled in the art. For a definition of the limits of the invention reference will be had primarily to the appended claims.

What is claimed is

1. In combination with the brake and clutch mechanisms of a motor vehicle, an element movable with said brake mechanism, a locking member adapted to engage said element to hold said brake mechanism in applied position, said member being adapted to be moved to locking position by movement of said clutch mechanism toward disengaged position, and means mounted on said locking member and movable by said clutch mechanism during the clutch engaging movement thereof to release said locking means.

2. In combination with the brake and clutch mechanisms of a motor vehicle, means movable with said brake mechanism, a member adapted to engage said movable means to frictionally hold said brake mechanism in applied position, and means pivotally mounted on said holding member whereby movement of said pivotally mounted means is adapted to move said holding member to release said movable means and the brake mechanism.

3. In combination with the brake and clutch mechanisms of a motor vehicle, means movable with said brake mechanism, means adapted to engage said movable means to hold said brake mechanism in applied position, and means pivotally mounted on said second-named means and engageable by said clutch mechanism to release said holding means.

4. The combination with the brake and clutch mechanisms of a motor vehicle, of a supporting member, an element associated with the brake mechanism and slidably extendng through said member, a locking member pivotally mounted on said member and adapted to engage said element to hold said brake mechanism in applied position, and means pivotally mounted on said locking member and adapted to engage said supporting member for moving said locking member to unlocked position.

5. In apparatus of the classe described, a frame member, a member slidably associated with said frame member, said members being mounted for movement relative to one another, a locking member pivotally mounted on said frame member and adapted to be moved to a position for holding said two first-named members against movement relative to each other in at least one direction, and means including a lever pivotally mounted on said locking member and adapted to be moved for moving said locking member to inoperative position.

6. In apparatus of the class described, brake mechanism, clutch mechanism, a member adapted to engage an element of said brake mechanism to hold the brakes in applied position, and cam means mounted on said member for movement independent of the clutch mechanism and adapted to be moved by an element thereof for rendering said member inoperative to hold the brakes in applied position.

7. In apparatus of the class described, brake mechanism, clutch mechanism, a locking member adapted to engage an element of said brake mechanism to hold the brakes in applied position, and means supported by said locking member and adapted to be moved by an element of the clutch mechanism for moving said locking member to inoperative position.

8. In apparatus of the class described, a frame member, a member slidably associated with said frame member, a locking member pivotally mounted on said frame member and adapted to be moved to a position for holding said two first-named members against movement relative to each other, and means for moving said locking member to inoperative position including a member pivotally mounted on said locking member.

9. In combination with the brake and clutch mechanisms of a motor vehicle, means including a locking member adapted to engage the brake mechanism to hold the brakes in applied position, and cam means pivotally mounted on said locking member and adapted to be moved by the clutch mechanism for rendering said first-named means inoperative to hold the brakes.

10. In combination with the brake and clutch mechanisms of a motor vehicle, means including a locking member adapted to engage the brake mechanism to hold the brakes in applied position, and means mounted on said locking member and adapted to be moved by the clutch mechanism for actuating said locking member.

11. In apparatus of the class described, brake mechanism, clutch mechanism, means for holding said brake mechanism in applied position including a movable member adapted to engage said brake mechanism and a holding element engaging said member, and means pivotally mounted on said holding element and movable by said clutch mechanism upon the engaging movement thereof for releasing said member.

12. In combination with the brake and clutch pedals of a motor vehicle, longitudinally movable means adapted to engage the brake pedal, friction holding means for said longitudinally movable means whereby the brake mechanism is held in applied position, and means pivotally mounted on said holding means and adapted to be moved by the clutch pedal for releasing said holding means.

13. The combination with the clutch and brake pedals of a motor vehicle of a frame member, an element adapted to engage the brake pedal, holding means adapted to engage said element to hold the brakes in applied position, means actuated by the clutch mechanism for releasing said holding means, and means associated with said element and frame member for yieldingly resisting the releasing movement of said brake pedal during the entire movement thereof.

14. The combination with the brake and clutch mechanisms of a motor vehicle of a brake locking device comprising a supporting frame stationarily mounted on said vehicle, a movable member slidably extending through said frame and adapted to engage the brake mechanism, cushioning means interposed between the lower end of said member and said frame, means for frictionally holding said member against movement relative to the frame, and means pivotally mounted on said holding means and adapted to be moved by the clutch mechanism for actuating said holding means to release said member.

15. The combination with the brake and clutch mechanisms of a motor vehicle of a locking device comprising supporting means, a movable member adapted to engage the brake pedal and slidably extend through said supporting means for support thereby, a locking member mounted on said supporting means and adapted to engage said first-named member for holding the latter against movement in at least one direction relative to said supporting means, and means pivotally mounted on said locking member and movable by the clutch mechanism for controlling said locking member.

16. A locking device comprising a stationary member, an element slidably supported by said member, means for locking said element against movement in at least one direction relative to said member, and means including a spring controlled cam mounted on said locking means for moving the latter to unlocking position to release said element.

17. In combination with the brake and clutch pedals of a motor vehicle, longitudinally movable means adapted to engage the brake pedal, a member adapted to engage said longitudinally movable means for holding the brake mechanism in applied position, and means pivotally mounted on said member and adapted to be engaged by the clutch pedal for moving said member to inoperative position.

18. The combination with a pair of pivotally mounted members of a locking device comprising a frame, locking means pivotally mounted on said frame for holding one of said members against movement in at least one direction, and a lever pivotally mounted on said locking means and movable by the other of said members for releasing said locking means.

19. In apparatus of the class described, a movable member, pivotally mounted locking means for holding said member against movement in at least one direction, resilient means normally holding said locking means in inoperative position, and means pivotally mounted on said locking means and operative for releasing said locking means.

20. The combination with the brake and clutch mechanisms of a motor vehicle of a supporting member, an element movable with the brake mechanism, a locking member pivotally mounted on said supporting member and adapted to engage said element for holding the brakes in applied position, resilient means for normally holding said locking member in inoperative position, said locking member being adapted to be moved to operative position by the clutch mechanism, a member pivotally mounted on said locking member and adapted to be engaged by the clutch mechanism for moving said locking member to inoperative position.

21. In combination with the brake and clutch mechanisms of a motor vehicle, means movable with said brake mechanism, locking means adapted to engage said movable means to hold said brake mechanism in applied position, said locking means being adapted to be moved to locking position by movement of said clutch mechanism toward disengaged position, and means mounted on said locking means and movable by said clutch mechanism during the clutch engaging movement of the latter to release said locking means.

22. In combination with the brake and clutch mechanisms of a motor vehicle, means movable with said brake mechanism, a member adapted to engage said movable means to hold said brake mechanism in applied position, and spring controlled means pivotally mounted on said holding member and movable by said clutch mechanism to move said holding member to inoperative position.

23. In combination with the brake mechanism of a motor vehicle, means movable with said brake mechanism, locking means adapted to engage said movable means to lock said brake mechanism in applied position, resilient means normally holding said locking means in inoperative position, means for moving said locking means to operative position, a member pivotally mounted on said locking means and adapted to move the latter to release said movable means, and other resilient means interposed between said pivotally mounted means and said locking means.

24. In combination with the brake and clutch mechanisms of a motor vehicle, a member movable with the brake mechanism, means adapted to be rendered operative by coaction with the clutch mechanism to lock said member against movement in at least one direction, resilient means normally holding said locking means in inoperative position, and means pivotally mounted on said locking means adapted to control the release thereof.

25. The combination with a brake and clutch mechanism of a motor vehicle of a frame, a member movable with the brake mechanism, an element pivotally mounted in said frame adapted to be rendered operative by coaction with the clutch mechanism for locking said member against movement in at least one direction, resilient means interposed between said frame and said element normally holding said element in inoperative position, and a lever pivotally mounted on said element for controlling the release of said element.

26. The combination with a pair of movable members of a locking device comprising a frame, holding means adapted to be moved into operative position by one of said members to lock the other of said members against movement in at least one direction, resilient means interposed between said frame and said holding means for opposing the movement of said holding means into locking position, and pivotal means adapted to be moved by said first-named member to disengage said holding means and release said other member.

27. The combination with a pair of pivotally mounted members of a locking device comprising a frame, holding means adapted to be moved into operative position by one of said members to lock said other member against movement in at least one direction, resilient means normally holding said locking means inoperative, and means pivotally mounted on said locking means adapted to be moved by said first-named member to disengage said holding means and release said other member.

28. In combination with the brake and clutch mechanisms of a motor vehicle, longitudinally movable means adapted to engage the brake mechanism, friction holding means for said longitudinally movable means whereby the brakes are held in applied position, and means pivotally mounted on said holding means and adapted to be moved by the clutch mechanism for releasing said holding means.

29. In combination with the brake mechanism of a motor vehicle, means movable with said brake mechanism, a locking member adapted to engage said movable means to lock said brake mechanism in applied position, resilient means normally holding said locking member in inoperative position, means for moving said locking member to operative position, and a lever pivotally mounted on said locking member whereby movement of said pivotally mounted lever is adapted to move said locking means to release said movable means and the brake mechanism.

30. In combination with the brake mechanism of a motor vehicle, means movable with said brake mechanism, locking means adapted to engage said movable means to lock said brake mechanism in applied position, resilient means normally holding said locking means in inoperative position, means for moving said locking means to operative position, and means pivotally mounted on said locking means whereby movement of said pivotally mounted means is adapted to move said locking means to release said movable means and the brake mechanism.

31. In combination with the brake and clutch mechanisms of a motor vehicle, a member movable with the brake mechanism, a locking element having an opening therethrough for slidably receiving said member, said element being adapted when in operative position to engage said member for holding the brake mechanism in applied position, resilient means normally holding said locking element in inoperative position, and means associated with the clutch mechanism for moving said locking member to operative position against the efforts of said resilient means during the movement of said clutch mechanism in clutch disengaging direction.

ERIC J. PILBLAD.